US010994412B2

United States Patent
Oyama (10) Patent No.: US 10,994,412 B2
(45) Date of Patent: May 4, 2021

(54) ROBOT CONTROL DEVICE AND ROBOT PROVIDED WITH THE SAME

(71) Applicant: KAWASAKI JUKOGYO KABUSHIKI KAISHA, Kobe (JP)

(72) Inventor: Yasunori Oyama, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 98 days.

(21) Appl. No.: 16/092,225

(22) PCT Filed: Apr. 6, 2017

(86) PCT No.: PCT/JP2017/014428
§ 371 (c)(1),
(2) Date: Oct. 9, 2018

(87) PCT Pub. No.: WO2017/175845
PCT Pub. Date: Oct. 12, 2017

(65) Prior Publication Data
US 2019/0262987 A1 Aug. 29, 2019

(30) Foreign Application Priority Data
Apr. 6, 2016 (JP) .............................. JP2016-076915

(51) Int. Cl.
*B25J 9/06* (2006.01)
*F16D 55/06* (2006.01)
(Continued)

(52) U.S. Cl.
CPC ................ *B25J 9/06* (2013.01); *B25J 19/00* (2013.01); *F16D 55/06* (2013.01); *F16D 65/127* (2013.01); *F16D 65/18* (2013.01); *F16D 66/00* (2013.01)

(58) Field of Classification Search
USPC .......................................................... 318/560
See application file for complete search history.

(56) References Cited

U.S. PATENT DOCUMENTS

| 4,907,467 A | * | 3/1990 | Toyoda | .................... B25J 9/042 |
| | | | | 74/490.03 |
| 2008/0156594 A1 | * | 7/2008 | Kobayashi | .............. F16D 59/02 |
| | | | | 188/72.3 |

FOREIGN PATENT DOCUMENTS

| JP | S60-143942 U | 9/1985 |
| JP | H05-22968 A | 1/1993 |

(Continued)

OTHER PUBLICATIONS

May 16, 2017 International Search Report issued in International Patent Application No. PCT/JP2017/014428.

*Primary Examiner* — Bentsu Ro
(74) *Attorney, Agent, or Firm* — Oliff PLC (57) ABSTRACT

A robot control device having a drive shaft driven by a servo motor including a non-excited operation type electromagnetic brake. The electromagnetic brake is configured to perform a braking operation by pressing an armature against a friction plate by an urging force of a spring when an excitation coil is not energized, and to cancel a brake operation by attracting the armature to the excitation coil side against the urging force of the spring to separate the armature from the friction plate when the excitation coil is energized. A coil current flowing through the excitation coil is obtained and the robot is controlled based on the characteristic of time change of the obtained coil current. A robot control device capable of shortening a cycle time, estimating the life of the electromagnetic brake, performing abnormality diagnosis and the like with a relatively simple configuration can be provided.

11 Claims, 4 Drawing Sheets

(51) Int. Cl.
  *F16D 65/12* (2006.01)
  *F16D 65/18* (2006.01)
  *B25J 19/00* (2006.01)
  *F16D 66/00* (2006.01)

(56) References Cited

FOREIGN PATENT DOCUMENTS

| | | |
|---|---|---|
| JP | H07-187566 A | 7/1995 |
| JP | H09-210106 A | 8/1997 |
| JP | 2008-128305 A | 6/2008 |
| JP | 2015-100878 A | 6/2015 |
| JP | 2015-182534 A | 10/2015 |

* cited by examiner

| Sample | 1 | 2 | 3 | 4 | 5 | 6 | 7 |
|---|---|---|---|---|---|---|---|
| Applied voltage [V] | 9.5 | 11.1 | 11.5 | 11.6 | 13.1 | 13.6 | 15.7 |
| Time to current decrease [msec] | 4.4 | 8 | 6 | 5.2 | 7.6 | 5.6 | 5.5 |
| Steady current Is [A] | 1.55 | 1.5 | 1.56 | 1.53 | 1.57 | 1.58 | 1.48 |
| Current decrease amount $\Delta I$ [A] | 0.16 | 0.21 | 0.29 | 0.29 | 0.15 | 0.29 | 0.37 |
| $\Delta I / Is$ | 0.10 | 0.14 | 0.19 | 0.19 | 0.10 | 0.18 | 0.25 |

FIG. 6

ROBOT CONTROL DEVICE AND ROBOT PROVIDED WITH THE SAME

TECHNICAL FIELD

The present invention relates to a robot control device for controlling a robot provided with a servo motor with a non-excited operation type electromagnetic brake and a robot provided with the control device.

BACKGROUND ART

A servo motor used for a drive shaft of an arm or the like of a robot, especially an industrial robot is generally provided with a non-excited operation type electromagnetic brake in order to prevent runaway or the like upon power loss during operation in addition to ensuring retention of the position at the time of stoppage.

Meanwhile, the robot using a servo motor with a non-excited operation type electromagnetic brake for a drive shaft has conventionally had the following problems.

Firstly, there is a problem in terms of the operation characteristics of the non-excited operation type electromagnetic brake. Specifically, in the non-excited operation type electromagnetic brake, an excitation coil, a spring, an armature and a friction plate are arranged in this order, and when the excitation coil is de-energized, it presses the armature against the friction plate by the urging force of the spring, and when the excitation coil is energized, it releases the brake operation by attracting the armature to the exciting brake side and pulling it away from the friction plate against the urging force of the spring.

When a constant DC voltage is applied to the excitation coil of such a non-excited operation type electromagnetic brake (hereinafter may be referred to simply as "brake"), the current flowing through the excitation coil varies depending on the time constant T expressed by the following equation, provided that the inductance of the excitation coil is L, the resistance is R, and therefore the attraction force of the armature by the excitation coil also increases with the time constant T. Note that, the time constant T is, for example, the time from when the voltage is applied until the current reaches 63.2% of the steady current value Is.

$$T = L/R \quad \text{(Equation 1)}$$

As described above, since the attraction force of the armature gradually increases with the time constant T, the brake operation is not substantially effectively released simultaneously with the application of DC voltage to the excitation coil. Therefore, it is difficult to determine the point in time at which the brake operation is substantially effectively released.

Therefore, in the control of the robot, a timer having set a predetermined time difference (hereinafter referred to as "timer time") is provided between servo motor control for the arm operation and control for the brake operation.

Here, since the time constant T and the attraction force and the like are different depending on the individual differences on the structure and shape of the brake, and the physical properties of the materials used (differences in electrical characteristics including changes over time such as dimensional errors or the like), the timer time is set to be longer so as to secure a margin on the safety side.

On the contrary, when the application of the DC voltage is canceled and the brake operation is performed, basically, the current and therefore the attraction force is reduced with the time constant T calculated by the above equation 1, and the attraction of the armature is released, so that the armature is pressed against the friction plate by the spring. However, in the electric circuit, if the current flowing through the excitation coil is forcibly released, in order to maintain the current flowing through the coil, the energy stored in the coil appears as a voltage in the reverse direction which is several tens of the excitation current (back surge or counter electromotive voltage), thus the semiconductor element in the control circuit may be damaged or insulation deterioration of the coil may occur. Accordingly, in order to lower the counter electromotive voltage, a discharge circuit is usually provided externally. Generally, the lower the counter electromotive voltage, the longer the armature release time becomes.

Therefore, considering that releasing the armature and performing braking operation, it is necessary to set the timer time longer than in the case of canceling the brake operation.

However, in recent years, particularly in industrial robots, shortening the cycle time including speeding up the operation and the like is a great need, and therefore setting a long timer time is contrary to these needs.

The second problem is the problem of estimation of the wear amount of the friction plate and the life detection of the brake due to friction. Specifically, in the electromagnetic brake in which the brake is operated by the frictional force between the armature and the friction plate, the wear of the friction plate progresses by use, and when the wear amount reaches a predetermined amount, it reaches the usage limit (life) and needs to be replaced.

Here, regarding the detection of the life and replacement, conventionally, it has been performed by disassembling the electromagnetic brake periodically to grasp the wear condition of the friction plate by visual observation or measurement, stopping the production line and manually measuring the attraction voltage of the electromagnetic brake, and the like, thus there is a problem that the operation rate declines and the detection operation is complicated.

The third problem is the problem related to robot operation and abnormality diagnosis at the time of stoppage. Specifically, the robot may stop its operation due to an unexpected cause during operation, and when the cause is due to an abnormality or failure of hardware such as disconnection of electric wiring, sometimes it is not easy to identify the cause. Therefore, there is a problem that it takes a long time to diagnose and identify the abnormality, and the stoppage of the production line becomes long, thus the operation rate declines.

Against the above-mentioned problems in the conventional technique and the like, for example, Patent Document 1 and 2 below are available to detect only the wear amount of the friction plate.

Patent Document 1 discloses a control device comprising a motor rotation angle detection means for detecting a motor rotation angle and a pad wear amount estimation device for estimating the wear amount of a friction pad, in which a pad wear amount estimation means estimates the wear amount of the friction pad from the rotation angle of the electric motor obtained by the motor rotation angle detecting means between the rear end where the linear motion portion of the linear motion mechanism moves away from the brake rotor and the forward end where the linear motion portion approaches the brake rotor to generate the braking force, and its object is only to estimate the wear amount of the friction pad.

Patent Document 2 discloses a differential function of differentiating a current flown to an excitation coil to obtain a differentiated signal and a time signal output function of calculating the time from the start of energization to the excitation coil until the armature is attracted from the differential signal and outputting it as a time signal, in which, from the time signal output by the time signal output function, it is determined whether or not the friction plate is at wear limit. Thus it requires a complicated means such as a differentiating circuit and becomes expensive and also its object is only to estimate the wear limit as in Patent Document 1.

However, in these conventional techniques, as described above, only the wear amount of the friction plate is detected by using relatively complicated functions and means, and furthermore, it is necessary to use relatively complicated functions and means.

CITATION LIST

Patent Document

[Patent Document 1] Japanese Patent Application Laid-open No. 2015-182534
[Patent Document 2] Japanese Patent Application Laid-open No. 2008-128305

SUMMARY OF INVENTION

Objects to be Achieved by the Invention

The present invention is made considering the above-mentioned problems of the conventional technology, and its object is to provide a robot control device capable of shortening a cycle time, estimating the life of the electromagnetic brake, performing abnormality diagnosis and the like with a relatively simple configuration, and a robot provided with the control device.

Means for Achieving the Objects

In order to achieve the above-mentioned objects, a first aspect of the present invention is a robot control device having a drive shaft driven by a servo motor including a non-excited operation type electromagnetic brake, wherein the non-excited operation type electromagnetic brake has an excitation coil, a spring, an armature, and a friction plate, and is configured to perform a braking operation by pressing the armature against the friction plate by an urging force of the spring when the excitation coil is not energized, and to cancel a braking operation by attracting the armature to the excitation coil side against the urging force of the spring to separate the armature from the friction plate when the excitation coil is energized, the robot control device being configured to obtain a coil current flowing through the excitation coil of the non-excited operation type electromagnetic brake and to control the robot based on a characteristic of time change of the obtained coil current.

A second aspect of the present invention is that, in the first aspect, the characteristic of time change of the coil current is a characteristic of current change after a voltage application point and after a voltage application cancelling point to the excitation coil, the robot control device being configured to estimate an attraction time of the armature from the voltage application point to an attraction point of the armature based on the characteristic of current change after the voltage application point to the excitation coil and/or to estimate a release time of the armature from the voltage application cancelling point to a release point of the armature based on the characteristic of current change after the voltage application cancelling point to the excitation coil, and to control the robot based on the estimated attraction time and/or release time of the armature.

A third aspect of the present invention is that, in the second aspect, the robot control device is configured to estimate a time at which the coil current increasing towards a steady current value by the voltage application starts to decrease and the current decrease reaches a preset decrease amount as an attraction point of the armature and/or to estimate a time at which the coil current decreasing by canceling the voltage application starts to increase and the current increase reaches a preset increase amount as a release point of the armature, and to control the robot based on the estimated attraction time and/or release time of the armature.

A fourth aspect of the present invention is that, in the second or third aspect, the robot control device is configured to estimate a wear amount of the friction plate and/or to determine whether or not the plate is at a wear limit based on a change over time of the attraction time and/or the release time of the armature estimated according to an operation of the robot including an abnormal stop.

A fifth aspect of the present invention is that, in any one of the first to fourth aspects, the robot control device is configured to obtain the coil current during normal operation of the robot and determine that a circuit of the excitation coil is abnormal when the obtained coil current reaches a preset current value.

A sixth aspect of the present invention is that, in any one of the first to fifth aspects, the robot control device is configured to obtain the coil current in a state where the electromagnetic brake is actuated and determine that the electromagnetic brake is abnormal when the coil current is equal to or larger than a predetermined value.

A seventh aspect of the present invention is that, in the sixth aspect, the robot control device is configured to further monitor presence or absence of position fluctuation obtained by a position detector provided in the servo motor when performing an abnormality determination of the electromagnetic brake.

In order to achieve the above-mentioned objects, a robot according to an eighth aspect of the present invention comprises: a robot control device according to any one of the first to seventh aspects; and a drive shaft controlled by the robot control device.

Advantageous Effect of the Invention

According to the present invention, there can be provided a robot control device capable of shortening a cycle time, estimating the life of the electromagnetic brake, performing abnormality diagnosis and the like with a relatively simple configuration, and a robot provided with the control device.

EMBODIMENT OF THE INVENTION

Hereunder, a robot control device according to one embodiment of the present invention and a robot provided with the control device will be described referring to the drawings.

The robot control device according to this embodiment acquires or monitors the current flowing through the excitation coil of the electromagnetic brake so as to perform appropriate control of the driving operation of the arm, etc. and abnormality diagnosis of the robot and the like, based on the characteristics of changing over time of the current or the like.

Figure 1:
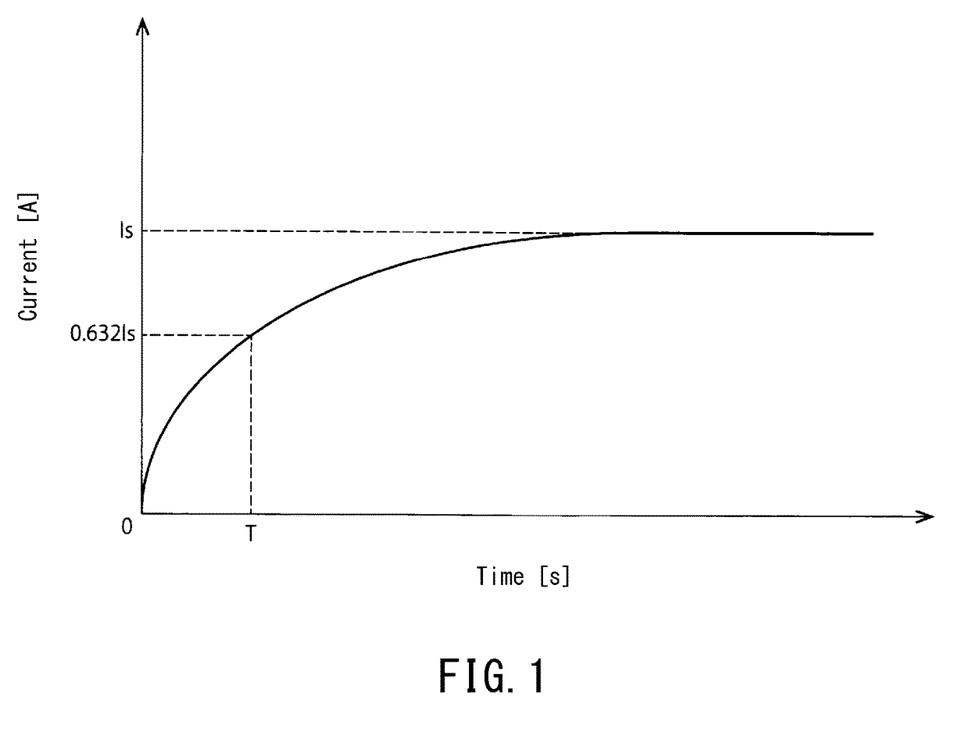
FIG. 1 is a diagram illustrating the change in the current flowing through the excitation coil when a DC voltage is applied to the excitation coil in the non-excited operation type electromagnetic brake in a case where the time constant is 0.632.
Figure 2:
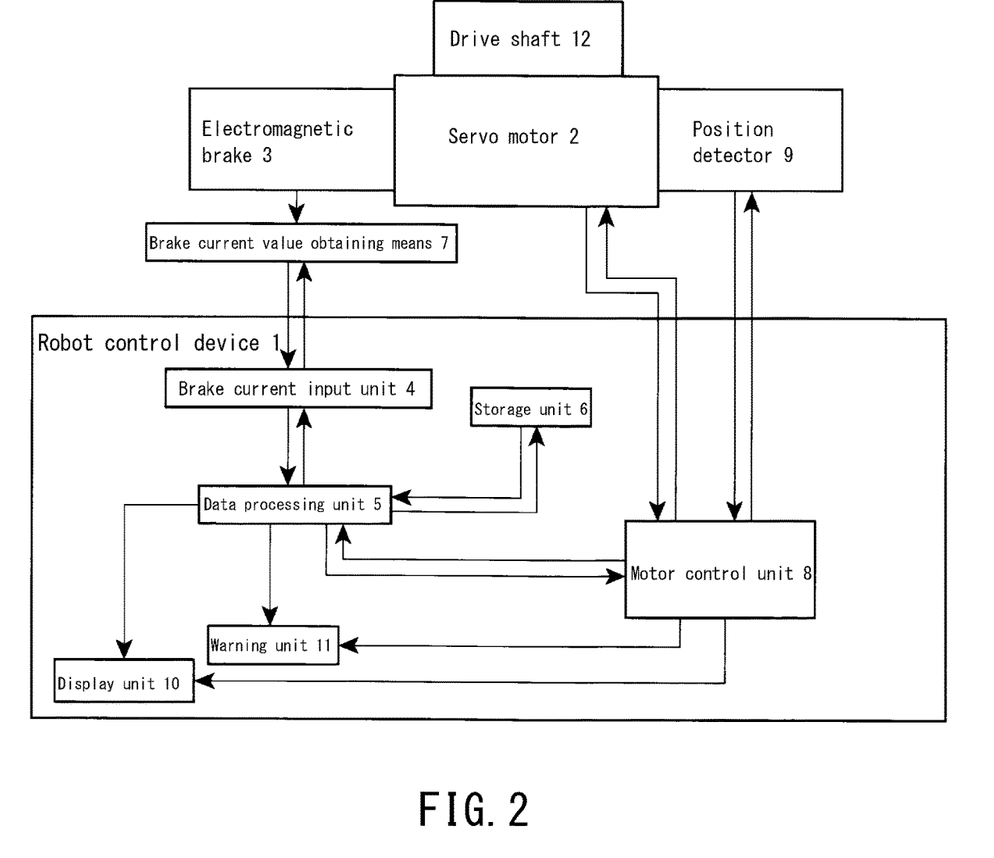
FIG. 2 is a block diagram illustrating a part related to a non-excited operation type electromagnetic brake of a control system of one embodiment of a robot control device according to the present invention.
Figure 3:
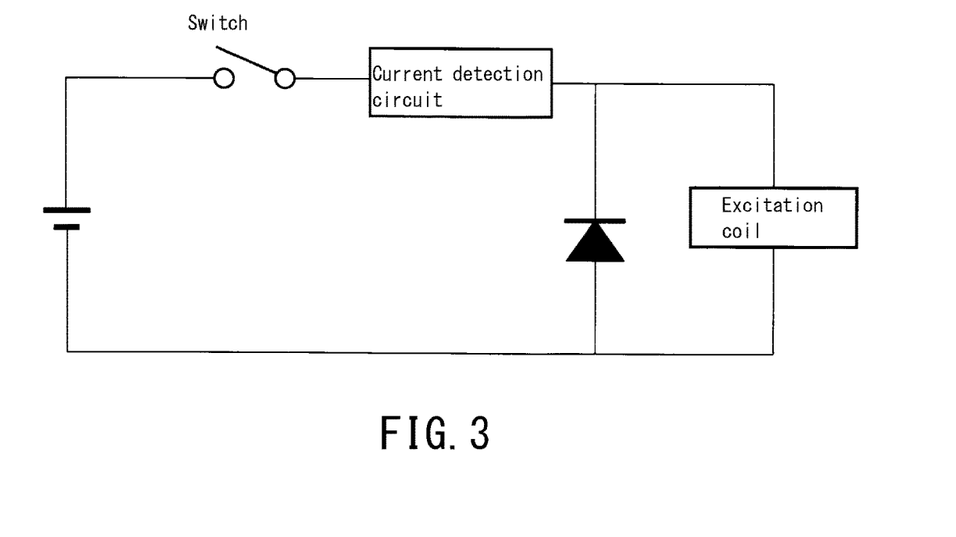
FIG. 3 is a simplified diagram illustrating an electric circuit of a non-excited operation type electromagnetic brake of one embodiment of the robot control device according to the present invention.

FIG. 2 is a block diagram illustrating a part related to a non-excited operation type electromagnetic brake of a control system of the robot control device according to this embodiment. FIG. 3 is a diagram illustrating a simplified electric circuit of the non-excited operation type electromagnetic brake of the robot control device according to this embodiment. Note that, in FIG. 3, a semiconductor element is used as a discharge circuit for declining the back surge to an appropriate value, while a varistor may be used.

The robot control device 1 comprises a brake current input unit 4 for inputting a brake current value from a brake current obtaining means 7 for obtaining a brake current value flowing through an excitation coil of an electromagnetic brake 3 attached to a servo motor 2 for driving a drive shaft 12 of a robot arm, a data processing unit 5 for performing data processing based on the brake current value input by the brake current input unit 4, and a storage unit 6 for storing or saving various data.

Note that, in the brake current value obtaining means 7 and/or the brake current input unit 4, amplification, conversion and the like of signals necessary for processing in the data processing unit 5 are carried out.

The data processing unit 5 reads necessary data from the storage unit 6 and/or writes the processed data in the storage unit 6 as necessary, and performs the following processing. Note that, the following processing is not necessarily executed by the same processing unit or processing means, and is executed by a subdivided sub-processing unit or sub-processing means in some cases.

(1) Detection of Attraction Time or Release Time of Armature

First, a case where a voltage is applied to an excitation coil to attract an armature so as to release the electromagnetic brake 3 will be described with reference to FIG. 4.

When a voltage is applied to the excitation coil, the current (coil current) flowing through the excitation coil starts to flow as described above, monotonously increases with a predetermined time constant determined by the inductance and resistance of the circuit, and finally becomes a steady current value. Accordingly, the coil current is small immediately after application and the pressing force of the spring against the friction plate is larger than the attraction force of the excitation coil. Thereafter, when the attraction force increases with an increase in current and becomes larger than the pressing force of the spring, the armature separates from the friction plate and moves to the excitation coil and stops.

Such a phenomenon from separation of the armature from the friction plate to the contact (stop) to the excitation coil will be explained electromagnetically as follows.

When the armature starts moving toward the excitation coil, eddy current is generated in the armature by the electromagnetic induction to generate a magnetic field which cancels the magnetic field by the excitation coil, and a counter electromotive force is generated in the excitation coil by the change of the magnetic field in the excitation coil generated by the eddy current. Therefore, due to this counter electromotive force, a current in the reverse direction (reverse current) is generated in the coil circuit, and due to the reverse current, the current flowing by applying the voltage is canceled and the current flowing through the excitation coil decreases.

Thereafter, when the armature comes into contact with the excitation coil and stops, the eddy current due to the electromagnetic induction in the armature disappears, and therefore the reverse current of the coil circuit also disappears, and the current flowing through the excitation coil is only the current by voltage application, thereby returning to the current change curve by the applied voltage.

Figure 4:
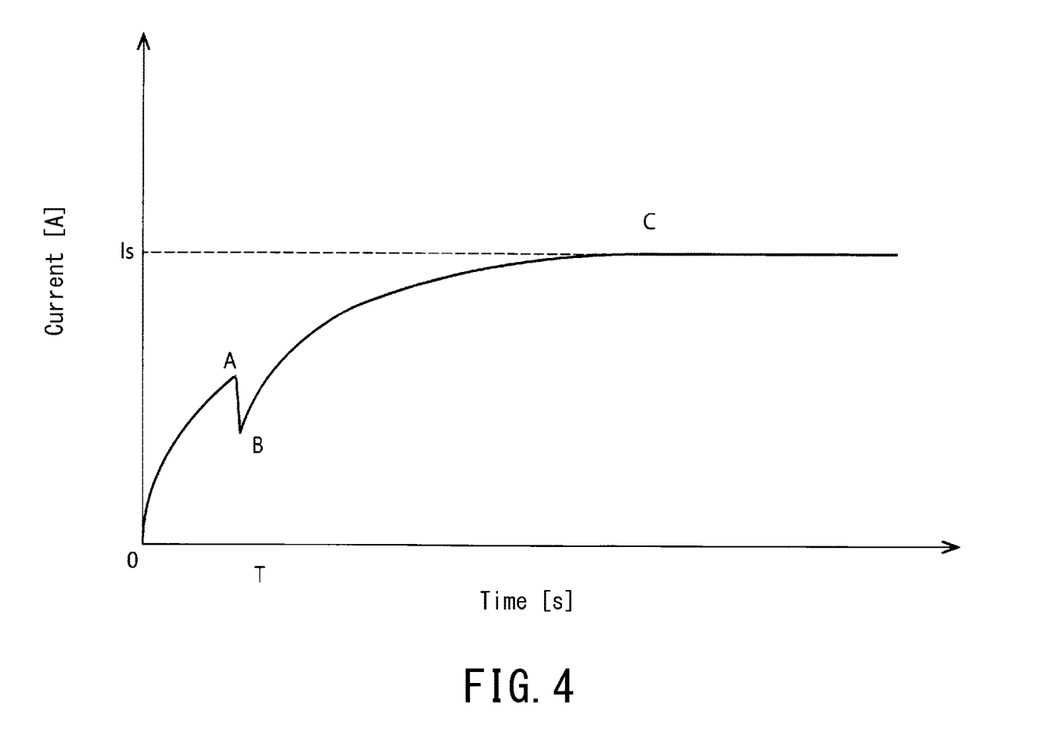
FIG. 4 is a diagram illustrating a rough change in current flowing through an excitation coil when a DC voltage is applied to an excitation coil and an armature is attracted.

Therefore, in FIG. 4, points A and B are considered to correspond to the separation of the armature from the friction plate and the contact with the excitation coil, respectively.

Here, according to the data obtained from the experiments conducted by the inventors, it has been confirmed that the coil current when the armature is attracted and moved to the excitation coil declines in a very short period of time, and the recovery of the current value after the decline to the original change curve is comparatively gentle. This is because, although after the armature is attracted and starts moving, the attraction force is much larger than the pressing force of the spring so that the attraction is mechanically completed in a short time, the reverse current generated by the movement of the armature gently disappears with a predetermined time constant since the energy is gradually consumed and disappears electrically due to the resistance component in the coil circuit after the armature stops.

From the above, although it is considered that the completion of the attraction of the armature is exactly at the end of the decrease in the coil current/at the start of the re-rise of the coil current (point B in FIG. 4), since the decrease in the coil current upon the attraction of the armature occurs in a very short time, even if control of the robot or the like is performed using any point of time between the start point (point A in FIG. 4) and the end point (point B in FIG. 4) of the current decrease as the completion point of attraction of the armature, there is no particular problem.

As a result, although there is a possibility that the time until the current flowing through the excitation coil is saturated and reaches the steady current may be considerably long, the cycle time may be reduced by controlling the robot setting the time point at which the mechanical attraction of the armature is completed as the time point at which said abrupt current decrease in the time change of the coil current occurs.

Therefore, in this embodiment, in the process in which the voltage is applied to the excitation coil and the coil current monotonically increases toward the steady current value, the current decrease (point A or B in FIG. 4) in the coil current is detected by specific means, and the detected time point is estimated to be the completion point of attraction of the armature and the time from the application time point of the voltage to the excitation coil to the estimated completion point of the attraction is calculated and estimated as the attraction time of the armature.

In the following, identification of the completion point of attraction of the armature will be described as one embodiment. In the present invention, however, any time point between the start point (point A in FIG. 4) and the end point (point B in FIG. 4) of the current decrease may be designated and used as the completion point of attraction of the armature, and it is not limited to the following.

Figure 6:
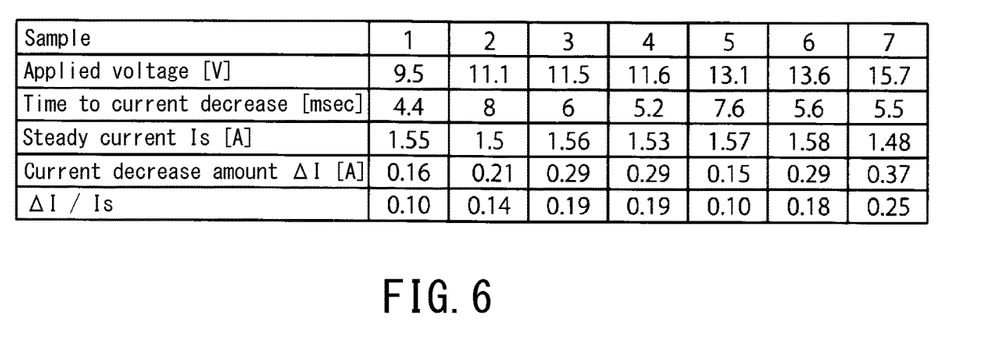
FIG. 6 is a table illustrating, in the non-excited operation type electromagnetic brake, measurement results of the time until the current flowing through the excitation coil decreases in the middle of the increase when the DC voltage is applied to the excitation coil, steady current value (Is), current decrease amount (ΔI), and current decrease amount (ΔI)/steady current value (Is).

FIG. 6 is a table illustrating, in the non-excited operation type electromagnetic brake, measurement results of the time until the current flowing through the excitation coil decreases in the middle of the increase when the DC voltage is applied to the excitation coil, steady current value (Is), current decrease amount (ΔI), and current decrease amount (ΔI)/steady current value (Is).

According to experiments conducted by the inventors, as illustrated in FIG. 6, the time to abrupt current decrease is about 4 to 8 msec, which is very short. Additionally, the current decrease amount (ΔI) at the time of current decrease is 0.15 to 0.37 A, which is a considerable current decrease.

According to the above knowledge acquired by the inventors, based on the obtained current change of the excitation coil, the time point at which the current decreases to the preset threshold value is set as the attraction completion point of the armature. Since the amount of current decrease at the time of armature attraction is large and it is possible to set a threshold value which is equal to or greater than the minute fluctuation of current, and the interval between the starting point of the decrease of the current and the starting point of the re-raising of the current is short, noise due to minute fluctuation or the like in the obtained current value can be eliminated by a simple configuration without performing differential processing or other complicated processing.

Note that a threshold previously set for the determination of the current decrease is stored in the storage unit 6, and is read from the storage unit 6 and used when obtaining the attraction completion point of the armature based on the brake current value obtained in the data processing unit 5. Additionally, obtaining of the current value flowing through the brake is executed by a command of the data processing unit 5.

The attraction time of the armature obtained in this way (the time from the point when the voltage is applied to the excitation coil to the point when the attraction of the armature is completed) is transmitted to a motor control unit 8 and used for drive control of the drive shaft of the robot arm. Note that, the attraction time of the armature varies depending on the wear of the friction plate as will be described later in (2), but it does not greatly change in a short time, thus it may normally be obtained at relatively long time intervals. Therefore, the detection of the attraction time of the armature is normally executed periodically by a command from the motor control unit 8 to the data processing unit 5.

Next, a case where the voltage applied to the excitation coil is canceled, so that the armature is released and pressed against the friction plate to actuate the electromagnetic brake 3 will be described.

In the circuit of the excitation coil, as illustrated in FIG. 3, a diode with opposite polarity with respect to the applied voltage of the coil is connected in parallel to the excitation coil for back surge attraction. Thereby, when the switch is turned off and the application of the voltage is canceled, all the back surge is returned to the excitation coil so that the back surge voltage is kept at a low pressure, while the current continues to flow through the excitation coil until the back surge energy is consumed by the circuit and disappears, and therefore the armature release time (the time from the point when the application of the voltage to the excitation coil is canceled to the point when the release of the armature is completed) becomes longer.

Figure 5:
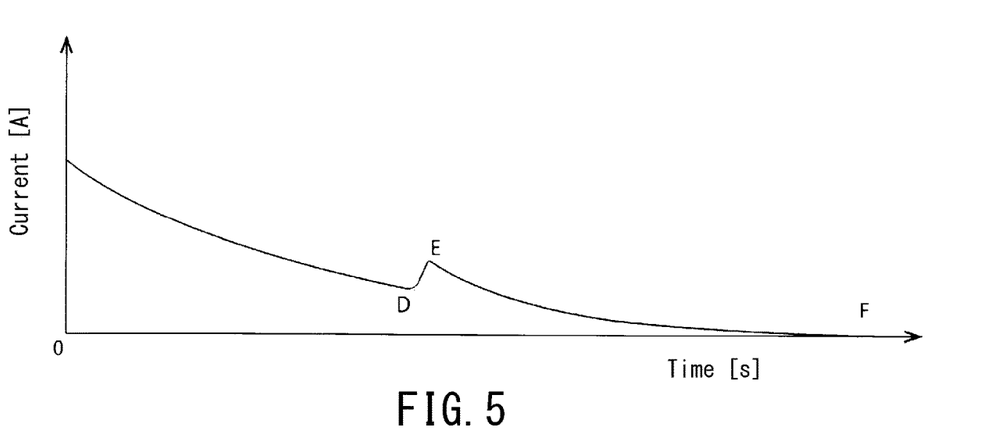
FIG. 5 is a diagram illustrating a rough change in current flowing through an excitation coil when the armature is released by releasing the DC voltage applied to the excitation coil.

Here, when the attraction force due to the decrease in the current decreases and becomes smaller than the pressing force of the spring in the process in which the current flowing through the excitation coil decreases, the armature is separated from the excitation coil and moves to the friction plate and stops, and therefore, regarding the current flowing through the excitation coil, contrary to the case of attraction of the armature, a reverse current is generated by the counter electromotive force due to the variable magnetic field in the excitation coil generated by the eddy current generated in the armature during movement (refer to FIG. 5). Accordingly, the current flowing through the excitation coil rises due to the reverse current, and thereafter, following the disappearance of the eddy current and eventually the disappearance of the reverse current flowing through the excitation coil, the current change accompanying the release of the applied voltage is restored.

Therefore, similarly to the case of armature attraction, the case where the armature is released and pressed against the friction plate to actuate the electromagnetic brake 3 is also set as the release completion point of the armature. However, since the change in the current is reversed, specifically, based on the obtained current change of the excitation coil, the point at which the current of the preset threshold rises after the start of the current rise is set as the release completion point of the armature.

Additionally, as in a case of attraction of the armature, as a simpler method, a current value corresponding to a time constant previously obtained by measurement or the like or a current value giving a margin to it is set, and the point at which the current rises to the set current value may be set as the release completion point of the armature.

The other processing or the like of the release time of the armature obtained by the data processing unit 5 is basically the same as in the case of attraction, thus the description will be omitted.

Note that, in order to strictly minimize the cycle time, it is desirable to control the operation of the drive shaft in consideration of both the attraction time and the release time of the armature. However, since the release time which is generally longer compared to the attraction time is practically short, it is also possible to control the operation of the drive shaft based on the release time even at a practical level. Note that, although the attraction time is generally shorter than the release time, the relationship between the attraction time and release time may previously obtained by a test, calculation, or the like, so that the brake set time which matches the release time based on the attraction time according to the obtained relationship between both may be set and estimated, and the operation of the drive shaft may be controlled based on the set and estimated brake operation time.

(2) Detection and Prediction of Brake Life by Wear of Friction Plate

When the friction plate wears as the brake is used, the distance (gap) between the excitation coil and the friction plate increases. Here, the attraction force of the armature by the excitation coil is proportional to the magnitude of the excitation current and inversely proportional to the gap between the excitation coil and the friction plate. Therefore, when the gap between them becomes long, in order to separate the armature from the friction plate overcoming the pressing force of the spring, it is necessary a larger excitation current flows compared to the initial state where there is no wear of the friction plate wear. Therefore, due to the progress of wear of the friction plate, the occurrence of the current decrease due to the armature attraction in the time-varying curve of the excitation current illustrated in FIG. 4 shifts to the direction of the larger current, and as a result the occurrence point of the current decrease also becomes late.

Therefore, in this embodiment, by acquiring, storing, and managing the occurrence time point of the current decrease periodically or occasionally during the service period of the robot, the state of wear of the friction plate is detected and the life is evaluated from the change over time of the current decrease. The occasional acquisition is assumed, for example, to grasp the amount of wear of the friction plate to be performed at the time of abnormality diagnosis described in the next section (3).

Specifically, the detection of wear and the life evaluation of the friction plate are conducted as follows.

(i) The relationship between the armature attraction time when attracting the armature (and/or the armature release time when releasing the armature. Hereinafter, it is referred to as "armature attraction time or the like" in (2)) and the wear of the friction plate is previously obtained by a test or calculation and stored in the storage unit 6.

Armature attraction time or the like can be obtained by the method described in the above (1) (the same applies hereinafter).

Further, the relationship between the armature attraction time or the like and the wear amount of the friction plate is stored in a table, a graph, or the like.

Note that, the limit wear amount, the level wear amount (for example, a predetermined wear amount approaching the limit wear amount, or the like) are also preset and stored in the storage unit 6. Hereinafter, these preset wear amounts are referred to as set wear amount.

(ii) Based on a command from the motor control unit 8, the armature attraction time or the like is obtained by the data processing unit 5 including the acquisition of the brake current value from the brake current value obtaining means 7 and the brake input unit 4 periodically or occasionally during the service period of the robot.

(iii) Based on the relationship between the armature attraction time or the like and the wear of the friction plate stored in the storage unit 6, the wear amount of the friction plate is estimated from the armature attraction time or the like obtained in the previous (ii).

The estimated wear amount is compared with the set wear amount stored in the storage unit 6, and according to the wear amount which exceeds the set wear amount, the fact is displayed on a display unit 10 of the robot control device 1, and an alarm is issued as necessary.

Further, the estimated wear amount is stored in the storage unit 6 and managed as a change over time, and is utilized for reference of the progress situation when subsequently estimating the wear amount, or the like.

Note that, although in the above description, the relationship between the armature attraction time or the like and the wear of the friction plate previously obtained by a test, calculation, or the like is stored in the storage unit 6 and it is compared with the wear amount estimated by the data processing unit 5, the storage unit 6 may store the armature attraction time or the like corresponding to the wear amount and set wear amount of the friction plate, not the relationship between the armature attraction time or the like and the wear of the friction plate, and it may be compared with the armature attraction time or the like obtained by the data processing unit 5.

(3) Abnormality Diagnosis Upon Stop of Robot Operation

When the robot abnormally stops during operation of the robot, judgment and diagnosis is made as to whether or not the stop is caused by the electromagnetic brake.

As in the previous two sections, the following diagnosis is performed by obtaining or monitoring the current of the electromagnetic brake.

(a) Abnormality Diagnosis during Normal Operation of the Robot

During operation of the robot, a voltage is applied to the excitation coil and the brake current is flowing to release the electromagnetic brake. Therefore, the following diagnosis is executed by constantly obtaining and monitoring the brake current during operation of the robot.

Specifically, when the electromagnetic brake is released, in the usual normal state, a stable steady current should flow as the brake current, and therefore if the current is not a steady current of a predetermined value, there is a possibility that an increase in the resistance value, a ground fault, a short circuit or the like due to deterioration of the coil or the like may occur, and if the current fluctuation (vibration) is severe, there is a possibility that a short circuit or the like may occur.

Accordingly, a predetermined threshold value (for example, ±10%) is preset for the steady current value and stored in the storage unit 6, and when the constantly obtained current value exceeds the threshold value, the fact is displayed on the display unit 10 of the robot control device 1, and if necessary, a warning unit 11 issues a warning alarm.

(b) Abnormality Diagnosis During Braking Operation

In the case where the coil current does not decrease or flows even after it decreases even though a command to release the current supply switch (refer to FIG. 3) to the excitation coil is issued by the brake operation command or the like in order to stop the robot operation or the like, it is considered that the voltage continues to be applied due to an abnormality such as operation malfunction of the open/close switch, short circuit of the coil circuit, or the like.

From the viewpoint of safety and the like, it is important for the electromagnetic brake to reliably operate the brake by the brake operation command, and the inactivation of the brake is extremely dangerous.

Therefore, when the main power supply of the robot control device is turned on, the brake current acquisition command is automatically issued, and in the state where the main power supply is on, the presence or absence of the brake current is constantly monitored. When the energization of the brake current is detected, for the sake of safety, the fact is displayed on the display unit 10 of the robot control device and also a warning alarm is issued.

Note that, when the main power supply is off, generally no electric power is supplied to the electromagnetic brake itself and no voltage is applied to the excitation coil, so the excitation current does not flow even if there is a short circuit or the like in the coil circuit. Therefore, the armature is not attracted and is pressed against the friction plate by the spring, so the brake is in the activated state, so that fall or runaway or the like of the arm does not occur.

Further, in addition to obtaining and monitoring the brake current during braking operation above, the signal of the position detector 8 (encoder or the like) (refer to FIG. 2) for detecting the rotation angle (position) of the servomotor driving the drive shaft is also obtained and monitored, and the presence or absence of the abnormality of the brake is detected from the presence or absence of the change.

This is because, for example, in the case where a foreign matter or the like is caught in the gap between the armature and the friction plate, or the friction between the armature and the friction plate does not function effectively due to breakage of the armature or the like, the brake may not function effectively even when there is no short circuit in the coil circuit and the coil current is not flowing. In such a case, the servo motor should originally not be servo-operated by the brake operation command, but there is a possibility that the arm slightly changes due to its own weight or other external force, and by obtaining and monitoring the position signal of the position detector 8, the mechanical abnormality of the brake is detected according to the presence or absence of such slight change.

As described above, according to the robot control device 1 of this embodiment, accurate attraction/release time of the armature can be obtained only by obtaining and monitoring the coil currents of the electromagnetic brake constantly and periodically, and as necessary, at appropriate times, and performing simple processing on the obtained coil currents. Thereby, it is possible to shorten the cycle time, estimate the wear amount and the life of the friction plate, and also easily perform electrical and mechanical abnormality diagnosis of the electromagnetic brake and the like.

DESCRIPTION OF REFERENCE NUMERALS

1 . . . robot control device
2 . . . servo motor
3 . . . electromagnetic brake
4 . . . brake current input unit
5 . . . data processing unit
6 . . . storage unit
7 . . . brake current obtaining means
8 . . . motor control unit
9 . . . position detector
10 . . . display unit
11 . . . warning unit
12 . . . drive shaft of robot arm

The invention claimed is:

1. A robot control device comprising:
a drive shaft; and
a servo motor configured to drive the drive shaft, the servo motor having a non-excited operation type electromagnetic brake including: (i) an excitation coil, (ii) a spring, (iii) an armature, (iv) a friction plate, and (v) a discharge circuit for lowering a counter electromotive voltage, the non-excited operation type electromagnetic brake being configured to:
perform a braking operation by pressing the armature against the friction plate via an urging force of the spring when the excitation coil is not energized, and
cancel the braking operation by attracting the armature to an excitation coil side against the urging force of the spring so as to separate the armature from the friction plate when the excitation coil is energized, wherein:
the discharge circuit lowers the counter electromotive voltage that is generated when the braking operation is performed by canceling an application of voltage to the excitation coil, and
the robot control device is configured to: (a) obtain a coil current flowing through the excitation coil of the non-excited operation type electromagnetic brake, and (b) control the robot based on a characteristic of time change of the obtained coil current.

2. The robot control device according to claim 1, wherein the robot control device is configured to:
obtain the coil current during a normal operation of the robot, and
determine that a circuit of the excitation coil is abnormal when the coil current which has been obtained reaches a preset current value.

3. The robot control device according to claim 1, wherein the robot control device is configured to:
obtain the coil current in a state where the electromagnetic brake is actuated, and
determine that the electromagnetic brake is abnormal when the coil current is equal to or larger than a predetermined value.

4. The robot control device according to claim 3, wherein the servo motor includes a position detector, and
the robot control device is configured to
further monitor a presence or an absence of a position fluctuation which has been obtained by the position detector of the servo motor when performing an abnormality determination of the electromagnetic brake.

5. A robot comprising:
the robot control device according to claim 1; and
a drive shaft which is controlled by the robot control device.

6. The robot control device according to claim 1, further comprising:
a processor programmed to:
obtain the coil current flowing through the excitation coil of the non-excited operation type electromagnetic brake, and
control the robot based on the characteristic of time change of the obtained coil current.

7. A robot control device comprising:
a drive shaft; and
a servo motor configured to drive the drive shaft, the servo motor having a non-excited operation type electromagnetic brake including: (i) an excitation coil, (ii) a spring, (iii) an armature, (iv) a friction plate, and (v) a discharge circuit for lowering a counter electromotive voltage, the non-excited operation type electromagnetic brake being configured to:
perform a braking operation by pressing the armature against the friction plate via an urging force of the spring when the excitation coil is not energized, and
cancel the braking operation by attracting the armature to an excitation coil side against the urging force of the spring so as to separate the armature from the friction plate when the excitation coil is energized, wherein:
the robot control device is configured to: (a) obtain a coil current flowing through the excitation coil of the non-excited operation type electromagnetic brake, and (b) control the robot based on a characteristic of time change of the obtained coil current, the characteristic of time change of the coil current is a characteristic of current change after a voltage application point to the excitation coil and after a voltage application cancelling point, and the robot control device is configured to:
- (1) estimate an attraction time of the armature from the voltage application point to an attraction point of the armature based on the characteristic of current change after the voltage application point to the excitation coil, and/or
- (2) estimate a release time of the armature from the voltage application cancelling point to a release point of the armature based on the characteristic of current change after the voltage application cancelling point of the excitation coil, and control the robot based on the estimated attraction time and/or the estimated release time of the armature.

8. The robot control device according to claim 7, wherein the robot control device is configured to:
- (1) estimate a time at which the coil current increasing toward a steady current value by the voltage application starts to decrease and its current decrease reaches a preset decrease amount as an attraction point of the armature, and/or
- (2) estimate a time at which the coil current decreasing by canceling the voltage application starts to increase and its current increase reaches a preset increase amount as a release point of the armature, and control the robot based on the estimated attraction time and/or the estimated release time of the armature.

9. The robot control device according to claim 7, wherein the robot control device is configured to:
- estimate a wear amount of the friction plate, and/or
- determine whether or not the friction plate is at a wear limit based on a change over time of the estimated attraction time and/or the estimated release time of the armature according to an operation of the robot including an abnormal stop.

10. A robot comprising:
the robot control device according to claim 7; and
a drive shaft which is controlled by the robot control device.

11. The robot control device according to claim 7, further comprising:
a processor programmed to:
- obtain the coil current flowing through the excitation coil of the non-excited operation type electromagnetic brake, and
- control the robot based on the characteristic of time change of the obtained coil current.

* * * * *